United States Patent [19]
Abersfelder et al.

[11] Patent Number: 5,646,614
[45] Date of Patent: Jul. 8, 1997

[54] SYSTEM FOR MONITORING THE FRONT OR REAR PARKING SPACE OF A MOTOR VEHICLE

[75] Inventors: Guenter Abersfelder; Helmut Grantz; Wolfgang Odebrecht, all of Sindelfingen, Germany

[73] Assignee: Mercedes-Benz AG, Stuttgart, Germany

[21] Appl. No.: 328,671

[22] Filed: Oct. 25, 1994

[30] Foreign Application Priority Data

Oct. 25, 1993 [DE] Germany .................. 43 36 288.5

[51] Int. Cl.$^6$ .................................................. B60Q 1/48
[52] U.S. Cl. ................. 340/932.2; 340/903; 340/435; 348/118
[58] Field of Search .............. 340/932.2, 903, 340/435, 904, 901; 348/113, 116, 118, 135, 143, 148, 149, 169, 170, 171, 172

[56] References Cited

U.S. PATENT DOCUMENTS

| | | | |
|---|---|---|---|
| 5,031,049 | 7/1991 | Toyama et al. | 358/227 |
| 5,091,781 | 2/1992 | An | 348/169 |
| 5,172,235 | 12/1992 | Wilm et al. | 348/149 |
| 5,235,315 | 8/1993 | Cherry et al. | 340/435 |
| 5,253,050 | 10/1993 | Karasudani | 348/118 |
| 5,289,321 | 2/1994 | Secor | 348/118 |
| 5,304,980 | 4/1994 | Maekawa | 348/170 |
| 5,314,037 | 5/1994 | Shaw et al. | 340/903 |
| 5,373,319 | 12/1994 | Lee | 348/169 |
| 5,386,285 | 1/1995 | Asayama | 340/904 |
| 5,410,346 | 4/1995 | Saneyoshi et al. | 348/116 |
| 5,461,357 | 10/1995 | Yoshioka et al. | 340/435 |

FOREIGN PATENT DOCUMENTS

| | | |
|---|---|---|
| 0 314 642 | 5/1989 | European Pat. Off. . |
| 0 529 619 | 3/1993 | European Pat. Off. . |
| 2465612 | 3/1981 | France . |
| 2 646 383 | 11/1990 | France . |
| 2673499 | 9/1992 | France . |
| 2 687 000 | 8/1993 | France . |
| 40 40 894 | 4/1992 | Germany . |
| 93 03 338.9 | 7/1993 | Germany . |
| 43 03 066 | 9/1993 | Germany . |
| 92 15 502.2 | 4/1994 | Germany . |

OTHER PUBLICATIONS

Japanese Abstract No. 61–202959, vol. 11, No. 34 (M–558), Jan. 31, 1987.
Japanese Abstract No. 63–009813, vol. 12, No. 210 (P–717), Jun. 16, 1988.
Japanese Abstract No. 4–170164, vol. 16, No. 475 (E–1273), Oct. 2, 1992.
Japanese Abstract No. 4–274941, vol. 17, No. 68 (M–1365), Feb. 10, 1993.
Japanese Abstract No. 62–70780, vol. 18, No. 682 (M–1729) Dec. 22, 1994.
Japanese Abstract No. 62–81455, vol. 94, No. 10, Oct. 7, 1994.

(List continued on next page.)

*Primary Examiner*—Brent A. Swarthout
*Attorney, Agent, or Firm*—Evenson, McKeown, Edwards & Lenahan, P.L.L.C.

[57] ABSTRACT

A system for monitoring the rear or front space of a motor vehicle being parked is provided. The system is based on a video camera having an image sharpness control, which can follow an object once detected, in terms of its sharpness, with the camera's autofocus over the whole search field, for example, by using fuzzy logic. The device uses this property for an image-processing-supported tracking of the viewing angle of a video camera which is designed to be pivotable and is used for rear-space or front-space monitoring, by which an object limiting the rearward or forward penetration depth of the vehicle can be seen up until contact with the vehicle's bumper. The device eliminates obstacles which previously prevented the use of such video cameras in the rear space monitoring of private cars. A corresponding device can also be provided and used for monitoring the front space of a vehicle.

12 Claims, 1 Drawing Sheet

OTHER PUBLICATIONS

Abstract—Japanese No. 1-164637, Jun. 28, 1989, M-874 Sep. 27, 1989, vol. 13/No. 432.

Abstract—Japanese No. 2-299944, Dec. 12, 1990, M-1085 Feb. 22, 1991 vol. 15/No. 77.

Abstract—Japanese No. 3-543, Jan. 7, 1991, M-1091 Mar. 11, 1991 vol. 15/No. 101.

Abstract—Japanese No. 2-274941, Sep. 30, 1992, M-1365 Feb. 10, 1993 vol. 17/No. 68.

*IEEE Spectrum* entitled "Fuzzy logic flowers in Japan", Jul. 1992, pp. 32–35.

Derwent WPI Abstract Accession No. 92-359447/44.

Distance a

Distance b

SYSTEM FOR MONITORING THE FRONT OR REAR PARKING SPACE OF A MOTOR VEHICLE

BACKGROUND AND SUMMARY OF THE INVENTION

The invention relates to a system for monitoring the front or rear parking space of a motor vehicle and, more particularly, to a system having a video camera built into either the front or rear of the vehicle and a viewing and monitoring device in the field of view of the vehicle driver connected to the camera. The field of view is fitted with a display screen.

Approach problems during the parking of vehicles, such as avoiding other vehicles, walls and the like, are well known. Known active systems which attempt to alleviate the approach problems, such as those having infrared light and/or ultrasonic sensors, suffer from a lack of measurement accuracy, reliability and reproducibility.

One alternative is represented by rear space video cameras, whose use in the area of commercial vehicles, such as airport courtesy vehicles, is already known. While the use of such video cameras, specifically in private cars, would be desirable due to the fact that parking spaces are becoming ever tighter, often requiring driving accuracy to within centimeters, the increasingly obscure rear parts of vehicles make this more difficult. The rear geometry of normal private cars, however, makes extremely wide angle lenses necessary. Unfortunately, such wide angle lenses provide the vehicle driver with an image which can hardly be interpreted.

There is therefore needed a system for monitoring the front or rear parking space of a motor vehicle which delivers to the vehicle driver a clear and easily interpretable display of the vehicle front or rear space and its boundary edges or obstacles.

These needs are met according the present invention by a system having a video camera built into either the front or rear of the vehicle and a viewing and monitoring device in the field of view of the vehicle driver connected to the camera. The field of view is fitted with a display screen. The video camera is equipped with means for its pivoting (turn and tilt) as a function of electric drive signals and is of the type having object referenced image sharpness control of its optics. This sharpness control is effective over the whole image angle detected, so that a corresponding sharpness measuring field is capable of following an object once detected over the whole screen. The system further includes an image processing unit which subdivides the image picked up into fields or quadrants and/or an edge region outside and a central region inside an auxiliary frame. The image processing unit is capable of discerning the instantaneous position of the sharpness measuring field with reference to at least one of the fields or quadrants and/or to the auxiliary frame and, as a function of a tendency of the sharpness measuring field to leave the original field/quadrant, not to reach a predetermined field or predetermined quadrant and/ or to cross from the central region over the auxiliary frame out into the edge region of the image field. The image processing unit generates the above-mentioned drive signals for the pivoting means according to the measure that the pivoting of the camera thereby effected counteracts the triggering tendency or neutralizes or eliminates the triggering tendency.

The present invention makes use of the fact that modern video cameras, which increasingly are controlled by "fuzzy logic", can follow an object once detected, in terms of its sharpness, with the autofocus (AF) over the whole search field or over the whole image angle, by which means the distance measuring field or sharpness measuring field moves along with the object, that is to say, in the case of its approach or removal is virtually dragged with it. In this respect, the sharpness adjustment is no longer search-field-referenced but object referenced.

According to the present invention, this property is used for an electronic tracking of the viewing angle of such a video camera used for rear-space or front-space monitoring. Because of this, an object limiting the rearward or forward penetration depth of the vehicle can be seen up until contact, for example, with the bumper and the remaining distance up until its disappearance can be seen or easily judged.

In this case, as a whole, the device according to the invention exhibits the advantage that camera lenses of very compact construction can be used, without the requirement of extending the camera for the purposes of realizing a sufficient viewing angle. The assembly of the camera is thus possible within the vehicle contour. The image interpretation is simplified for the driver by the concentration of the image section on the essential obstacle, and complicated image processing and image preparation, as are unavoidable in the case of extreme wide angle optics, can be eliminated.

Accordingly, a "passive" system having an object-referenced guided video camera can be supported at least by means of an additional "active" system, for example an ultrasonic or infrared or laser system. Such an additional system either acts redundantly in situations in which the passive system is subject to functional limitations. Alternatively, signals from at least one such additional system support the active detection of obstacles on the camera side, for example in the case of rear space monitoring.

The use of an additional active system proves advantageous, for example in the case of obstacles having a low structure, in which autofocus control of a video camera via fuzzy logic can also fail or, on its own, delivers too large a decision time delay.

Differing from conventional active ultrasonic or light measuring systems, at least one additional system of this type can therefore be primarily used here not for warning or giving alarms, but for influencing or supporting the capture and object following behavior of the electronic autofocus function of a video camera. By means of connecting the passive system to at least one of the above-mentioned active systems in a device, the respective weaknesses of the relevant individual systems are thus overcome in any case.

As a whole, the present invention clears essential obstacles which previously stood in the way of the use of video cameras, especially in the rear space monitoring of private cars. It is self-evident, that the possibilities of use of the device according to the invention are not limited to the rear space of a vehicle; a corresponding device can nonetheless also be provided and used for monitoring the front space of a vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
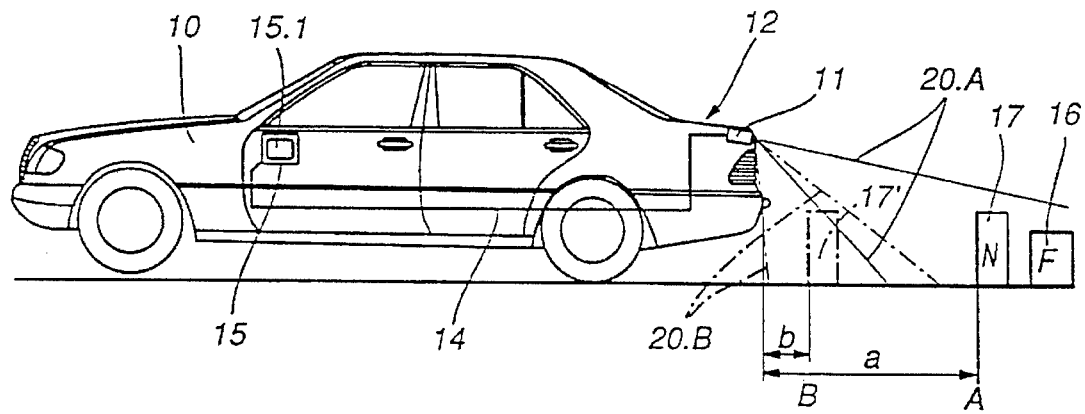
FIG. 1 is a schematic side view of the system of the present invention which is provided in a vehicle, as well as two examples of relevant obstacles in the case of rearward parking.

According to FIG. 1, the system according to the invention includes, for example, a video camera 11 built into the rear 12 of a vehicle 10. The following description is given by way of example for a rear space viewing system, and it is readily understood that a similar system could be used at the front of the vehicle. The camera 11 is fitted with an autofocus measuring system and is connected via a connecting lead 14 to a viewing and monitoring device 15 located in a visual range of the vehicle driver. In this case, the camera 11 can be pivoted (that is to say tilted and turned) under electronic control, by means not shown in the figure, through the angle δ shown in the top view according to FIG. 2. The viewing and monitoring device 15 has a screen 15.1 for the driver-side display of the current camera image or field of view.

Also shown is the bumper 13 and, moreover, a distant obstacle 16 or 16' designated by "F" and a near obstacle designated by "N". The near obstacle "N" is identified by 17 in the condition A of an even larger distance "a" from the rear end or bumper 13 of the vehicle 10 and identified by 17' in the condition B of a smaller distance "b" from the rear end or bumper 13 of the vehicle 10. The identifications 16 and 16' correspond, in a similar manner, to the two conditions A and B. Furthermore, the bounding beams 20.A and 20.B of the respective viewing angle α of the camera 11 in the two (stationary) conditions A and B are shown.

Figure 2:
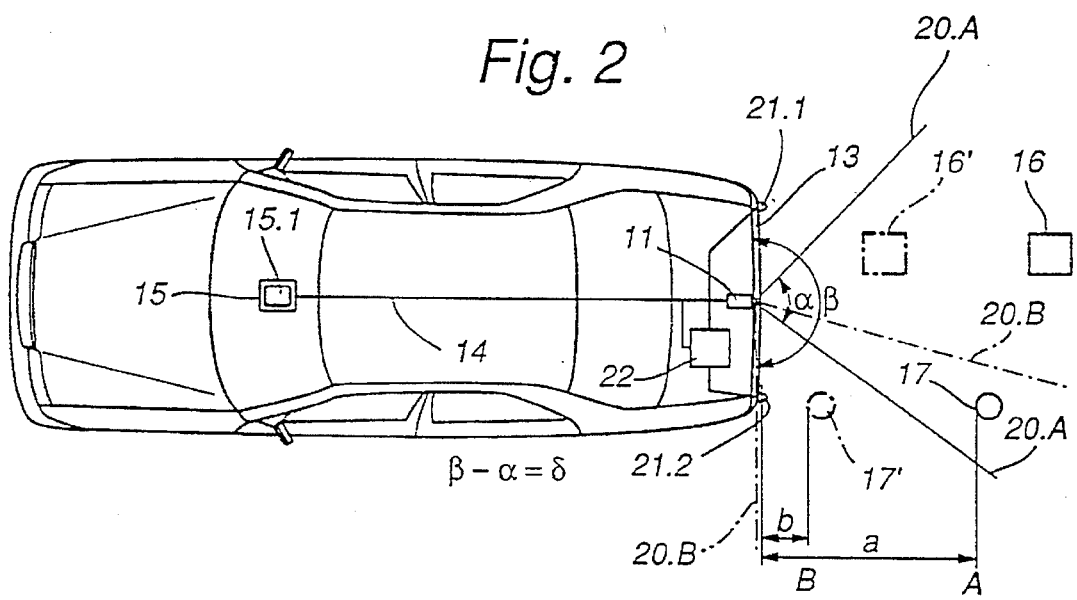
FIG. 2 is a schematic top view of the system, including at least one active system and corresponding sensors, built into a vehicle, as well as two examples of relevant obstacles in the case of rearward parking.

FIG. 2 shows the configuration according to FIG. 1 in a top view. Proceeding from the elements known from FIG. 1, the image angle α, the scan angle β, the pivoting angle δ={β−α}, and additional sensors 21.1 and 21.2 in the two end regions of the bumper 13 of at least one active ultrasonic or light-based measuring system are also shown here. The signal processing or signal evaluation of the system can be accommodated in a special module 22, in which the electronics necessary for driving the pivoting device on the camera side can also be accommodated. Such a module 22 can be connected directly to the camera or to the viewing and monitoring device 15 or can also be connected to both by means of a connection with the lead 14. Also apparent here are the bounding beams 20.A and 20.B of the respective viewing angles of the camera 11 in the two (stationary) conditions A and B.

Figure 3A:
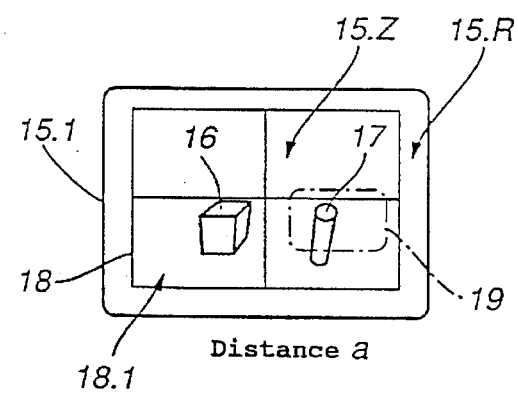
FIGS. 3a, 3b illustrate two schematic representations of two situation displays displayed to the vehicle driver on a display screen during reversing, these displays correspond to a larger distance "a" and a smaller distance "b" of the bumper from the nearest obstacle.

In FIG. 3a, an auxiliary frame 18 with, for example, field or quadrant division 18.1 can be seen on the screen 15.1. Furthermore, the objects 16 and 17 are displayed, as seen by the camera in the condition A, that is to say in the case of an even greater distance "a" of the bumper 13 from the near object 17.

In this case, therefore, both objects 16 and 17 are still within the image angle of the camera 11 symbolized by the bounding beams 20.A. Moreover, the object 17 situated closer is within the current sharpness measuring field 19, and is therefore the image content part currently controlling the image sharpness and, in this respect, dragging the measuring field 19 with it. It is shown that, in the condition A, the camera 11 essentially still detects the whole rear space and thus all obstacles with which the vehicle could collide.

Figure 3B:
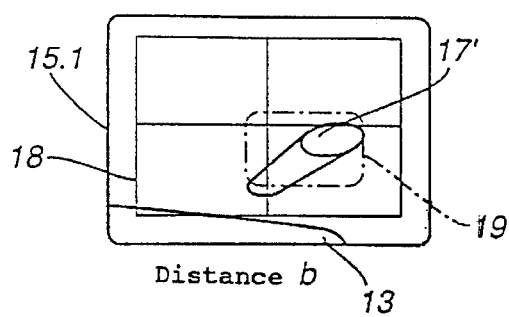

The display on the screen 15.1 according to FIG. 3b corresponds to the condition B in the case of an already considerably reduced distance "b" of the bumper 13 from the object situated closer, which is here identified by 17' corresponding to FIGS. 1 and 2. In this case, the field of view corresponds to the image field angle between the bounding beams 20.B in FIGS. 1 and 2.

While the object 17' is therefore still in the dragged measuring field 19 in the central region 15.Z of the screen 15.1, the distant object 16—not dominant in the central region 15.Z even in the condition A, that is to say even at a greater distance "a"—has disappeared from the original field or quadrant 18.1, over the auxiliary frame 18 and the edge region 15.R of the screen, from the field of view of the camera 11 (already intermediately pivoted). As a result of the pivoting of the camera 11—instead of the distant object 16, a portion of the rear contour of the vehicle, specifically the bumper 13, is moved into the field of view (FIG. 3b).

By means of the insight which has thus become possible of the ever decreasing distance b, the vehicle can thus be driven accurately to within centimeters, for example, until the bumper 13 makes contact with the near object 17'. It is understandable that, in so doing, the image angle of the camera does not have to be significantly altered, so that no complicated, long or expensive lens is necessary.

Not further shown in the figure is an image processing unit which can be realized in any arbitrary manner, and which can be accommodated or implemented either completely in the camera 11, completely in the viewing and monitoring device 15, distributed over the camera 11 and the viewing and monitoring device 15, or else accommodated or implemented mainly inside the measuring unit 22.

It is only essential for the invention that the image processing unit, as a component of the device, is capable of detecting a movement of the object-referenced sharpness measuring field 19 in the image plane and to evaluate it into at least one pivoting signal which when fed as a drive signal to the means for pivoting the camera—effects a pivoting of the camera in such a manner that the sharpness measuring field 19 optionally does not leave an original detection quadrant, reaches and fills at least one predetermined detection quadrant and/or—as far as possible—does not wander from the central region of the image field over the auxiliary frame 18 out into the edge region of the image field, that is to say out of the viewing angle of the camera.

The image-processing-supported cooperation of the camera 11 with the viewing and monitoring device 15 optionally also as a function of signals which are emitted by additional distance-detecting sensors 21.1 and 21.2 on at least one additional sonic or light-based measuring system 22, as described further below, is as follows.

Upon reaching a critical distance to an obstacle, the image processing unit seeks the nearest obstacle 17 for a further approach. In this respect, the "critical" distance is determined by means of a scan cycle while pivoting the camera through the pivoting angle δ=(β−α) [where β=scan angle, α=image angle], initially in the complete detection range of the camera (image field+pivot). Once detected, the autofocus measuring system of the camera 11 adjusts its optics to the corresponding nearest obstacle 17.

From this point in time, the near obstacle 17 is dominant, that is to say, the autofocus control of the camera, in conjunction with the above-mentioned image processing unit, effects the dragging along of the sharpness measuring field 19 which is incident on the dominant object, independently of further relative movements between camera 11 and near obstacle 17. The image processing unit thus ensures as a whole, not only that the sharpness range corresponding to the distance or movement of the vehicle relative to the near obstacle 17, 17' in its spatial depth is displaced with reference to a contour identified once in the measuring field 19, but also that the camera is additionally pivoted in such a manner that the sharpness measuring field 19, independently of its possibly also wandering position on the screen, cannot disappear out over its edge, and also inasmuch as the obstacle of interest cannot disappear from the field of view of the vehicle driver.

During this dragging process, the correspondingly changing distance "a", "b" between the bumper 13 and the near obstacle 17, 17' can be continuously measured by suitable means and can be overlaid on the screen 15.1. For this purpose, sound and/or light measuring means, separate, or as additional means already mentioned as included in the system, are suitable.

For high measuring accuracy and a comfortable imaging size of obstacles occurring in practice and an ability to easily judge the displayed distance relations, a camera lens not having too short of a focal length has proved to be expedient. Because the image angle achievable with one such lens is not sufficient, for example also to include in the image the entire vehicle rear from a base position of the camera 11, the image processing unit ensures that if, in the case of further approach, the near object 17' wanders to the image field edge and threatens to disappear from the displayed field of view, the camera is re-pivoted in such a manner that the near object can leave the reproduced field of view of the camera only because the field of view is limited by the rear or front contour of the vehicle.

The image displayed to the vehicle driver on the screen 15.1 therefore finally shows the obstacle at the absolutely smallest possible distance "b" measured in the longitudinal direction of the vehicle, always in relation to the vehicle contour appearing somewhere on the edge of the screen, as shown, for example in FIG. 3b in relation to the bumper 13.

If, for example, during a rearward approach of the vehicle 10, the obstacle 16 or 17' should move out of the field of view of the camera 11 (specifically, past the vehicle towards the front), it is detected as not collision-dangerous, and the image processing unit searches for the next obstacle to be considered by means of a new scan process.

However, although an obstacle present is detected as critical and followed, it can occur that, in the meantime, an even nearer and even more relevant obstacle appears. The more relevant obstacle would then not be detectable because of a lack of sharp imaging capability (outside the measuring field 19 dragged by the obstacle already present).

In order to prevent this from occurring, the scan process mentioned above is repeated at minimum time intervals, specifically at such a rate that the vehicle driver is not disturbed during driving up to the obstacle. In this case, it is only essential that the vehicle driver is definitely presented with the important obstacle to him corresponding to the direction of driving of the vehicle.

Also lying within the scope of the present invention is that the system, instead of or additionally to means for triggering and effecting the said scan process, also includes another independent unit 22 for the detection of the respective nearest obstacle. In this case it can be, for example, a laser scanner with a moving beam or a system based on CCD image detection elements as sensors 21.1 and 21.2. In any case, these can be connected at least to the viewing and monitoring device 15 on the driver's side, so that detection results of such additional scanning devices can also be displayed on the screen 15.1 of the viewing and monitoring device 15, for example also inserted into the continuous image transmission.

It is also within the scope of the invention that the additional devices are operatively connected to the image processing unit in such a way, and the latter is designed in such a way, that it can derive data about the relevant position of an obstacle in the image field of the detection space of the additional devices, and can transmit them, at least for the pivoting pre-adjustment of the video camera for the purpose of immediate centering of its sharpness measuring field, to the pivoting means of the camera, in order to thus achieve the most rapidly possible sharp imaging of the critical obstacle.

According to the present invention, such an additional module continuously monitors the whole space behind or in front of a correspondingly equipped vehicle, in order to thus continuously detect obstacles occurring. For this purpose, the additional module has means which, for the purpose of the pivoting adjustment of the camera 11 in the event of the (wide angle) detection of a relevant obstacle, can transmit its position within the total field of view of the independent detection unit to the viewing and monitoring device 15 or directly to the camera 11 or to the pivoting means connected to the latter. This is done so that the viewing angle of the camera 11 is thus always pre adjusted or drawn towards the most relevant obstacle.

Since, in the case of obstacles having only a low structure, the autofocus function is slowed down or fails completely, the system can alternatively also include an additional ultrasonic or infrared light measuring system, which permanently monitors the space behind or in front of the vehicle.

Such a system, as a component of the device, can in this case be operated both redundantly and also as a system cooperating with the camera 11 and the viewing and monitoring device 15, which achieves for the viewing and monitoring device is an analogous function of the selection of obstacles for the pre-positioning of the camera 11.

For the purpose of optimization of the focal length of the camera lens, it has proved to be expedient to provide a pivoting and tilting angle for the camera 11 of up to about 30° from the neutral position. At such a pivoting angle, the camera 11 or its lens can still be accommodated mostly within the contour of the vehicle 10, so that good protection can be realized without greater expenditure.

What is claimed is:

1. A system for monitoring a space in front of or in a rear of a motor vehicle which is being parked, the system comprising:

a video camera built into either the front or rear of the vehicle;

a viewing and monitoring device, having a display screen, operatively coupled to said video camera, said viewing and monitoring device being located so as to be in a field of view of a driver of said vehicle;

means for pivoting said video camera as a function of electric drive signals, said video camera having object-referenced image sharpness control of its optics, said sharpness control being effective over a whole image angle detected by said video camera such that a corresponding sharpness measuring field is able to follow an object over the entire display screen once it is detected;

an image processing unit which subdivides an image picked up by said video camera into at least one of fields, quadrants, and an edge region arranged outside and a central region arranged inside an auxiliary frame as reference fields for discriminating the object subjected to said sharpness control across the display screen, said image processing unit discerning an instantaneous position of said sharpness measuring field with reference to said at least one of the fields, quadrants and edge and central regions of the auxiliary frame;

said image processing unit generating said electric drive signals for said pivoting means to pivot the video camera such that the sharpness measuring field at least one of does not leave an original field or quadrant, reaches a predetermined field or predetermined quadrants, and does not cross from the central region over the auxiliary frame into the edge region of the image field, so as to one of counteract, neutralize and eliminate a sampling pivoting of the video camera from being triggered.

2. A system according to claim 1, wherein said object-referenced image sharpness control is carried out using fuzzy logic.

3. A system according to claim 1, wherein said image processing unit is designed such that at least one of: before the detection of a nearest obstacle and after the loss of detection of a sharpness dominant near obstacle, at least one sampling pivoting of the camera is triggered, fully covering a pivoting angle δ of the video camera in order to detect a most complete field of view (β) possible.

4. A system according to claim 3, wherein said image processing unit is further designed such that, during a sequence of following a sharpness-dominant near obstacle, said image processing unit undertakes a corresponding cyclical scan sequence at high speed, for detecting newly occurring obstacles.

5. A system according to claim 4, further comprising means for electronically storing a last respective image, and in that the image picked up during a cyclic pivoting scan sequence of the video camera is blanked out and can be displayed on the screen together with an added warning marker instead of the last image displayed and stored before the scan sequence, and in that an immediate insertion of a screen image from the cyclic scan sequence currently in the process of being carried out takes place when the image processing unit recognizes, in so doing, a near obstacle more critical than that already currently in the process of being followed.

6. A system according to claim 1, further comprising at least one of additional active sound-based and light-based means and sensors cooperating with said system for the detection of the respective nearest obstacle.

7. A system according to claim 6, wherein said additional means are connected at least to said viewing and monitoring device on a driver's side, and in that detection results of said additional means can be displayed on the displaying screen of said viewing and monitoring device.

8. A system according to claim 6, wherein said additional means are operationally connected to said image processing unit, said image processing unit being designed such that it can derive data for a relevant obstacle via its relative position in the image field of a detection space of the additional means, and can transmit the data, at least for a pivoting preadjustment of the video camera for the purpose of immediate centering of its sharpness measuring field, to the pivoting means of the video camera.

9. A system according to claim 1, further comprising laser scanning means for detecting a respective nearest obstacle using a moving beam.

10. A system according to claim 9, wherein said laser scanning means are connected at least to said viewing and monitoring device on the driver's side, and in that detection results of the laser scanning means can likewise be displayed on the display screen of said viewing and monitoring device.

11. A system according to claim 1, further comprising means for allowing the distance of the vehicle from the currently nearest obstacle to be measured and co-indicated on the display screen during a continuous detection and display of a distance situation to the currently nearest obstacle.

12. A system according to claim 11, wherein at least one of sound and light measuring means are used.

* * * * *